(12) United States Patent
Nishizawa et al.

(10) Patent No.: US 7,565,047 B2
(45) Date of Patent: Jul. 21, 2009

(54) OPTICAL WAVEGUIDE STRUCTURE, OPTICAL MODULE AND LENS ARRAY

(75) Inventors: Motoyuki Nishizawa, Kawasaki (JP); Akio Sugama, Kawasaki (JP); Shigenori Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/252,715

(22) Filed: Oct. 19, 2005

(65) Prior Publication Data

US 2006/0291777 A1 Dec. 28, 2006

(30) Foreign Application Priority Data

Jun. 23, 2005 (JP) ............... 2005-183711

(51) Int. Cl.
G02B 6/32 (2006.01)
G02B 6/26 (2006.01)
G02B 6/36 (2006.01)

(52) U.S. Cl. .............. 385/33; 385/31; 385/52; 385/88

(58) Field of Classification Search ............ 385/31–33, 385/39, 41, 88–94, 147
See application file for complete search history.

(56) References Cited

U.S. PATENT DOCUMENTS

| | | | | |
|---|---|---|---|---|
| 5,500,869 A * | 3/1996 | Yoshida et al. | ............ | 372/50.23 |
| 6,356,688 B2 * | 3/2002 | Blom | ............ | 385/52 |
| 6,374,004 B1 * | 4/2002 | Han et al. | ............ | 385/14 |
| 6,419,405 B1 * | 7/2002 | Boscha | ............ | 385/93 |
| 6,488,417 B2 * | 12/2002 | Kropp | ............ | 385/88 |
| 6,542,296 B2 * | 4/2003 | Lee et al. | ............ | 359/462 |
| 6,868,207 B2 * | 3/2005 | Wickman | ............ | 385/37 |
| 2002/0064347 A1 * | 5/2002 | Mertz et al. | ............ | 385/52 |
| 2005/0259927 A1 * | 11/2005 | Kato | ............ | 385/93 |

FOREIGN PATENT DOCUMENTS

JP 2004-85913 3/2004

OTHER PUBLICATIONS

Patent Abstract of Japan, Publication No. 2001-083374, dated Mar. 3, 2001.
Patent Abstract of Japan, Publication No. 2001-108871, dated Apr. 20, 2001.
Patent Abstract of Japan, Publication No. 2005-115346, dated Apr. 28, 2005.
Patent Abstract of Japan, Publication No. 2003-270482, dated Sep. 25, 2003.

* cited by examiner

*Primary Examiner*—Tina M Wong
(74) *Attorney, Agent, or Firm*—Westerman, Hattori, Daniels & Adrian, LLP.

(57) ABSTRACT

Disclosed is an optical waveguide structure capable of keeping intervals between the structure and optical elements within a certain range. When arranging a surface light emitting element and a surface light receiving element on a positioning plate provided on a substrate, elastic layers are provided between the elements and the plate. When fitting and fixing first projections of the structure in holes of the plate, second projections formed in a predetermined dimension on the structure are brought into contact with the light emitting element and the light receiving element. Therefore, intervals between lenses, and the light emitting element as well as the light receiving element are controlled within a certain range according to the dimension of the second projections. Further, stress occurring due to contact is dispersed by the elastic layers so that breakage of the light emitting element and the light receiving element can be prevented.

6 Claims, 9 Drawing Sheets

OPTICAL WAVEGUIDE STRUCTURE, OPTICAL MODULE AND LENS ARRAY

CROSS-REFERENCE TO RELATED APPLICATIONS

This application is based upon and claims the benefits of priority from the prior Japanese Patent Application No. 2005-183711, filed on Jun. 23, 2005, the entire contents of which are incorporated herein by reference.

BACKGROUND OF THE INVENTION

1. Field of the Invention

The present invention relates to an optical waveguide structure, an optical module and a lens array. Particularly, the present invention relates to an optical waveguide structure used for optical-coupling between an optical element such as a surface-emitting laser, and an optical transmission medium such as an optical fiber. The present invention also pertains to an optical module using the optical waveguide structure, and a lens array having lenses arranged in an array.

2. Description of the Related Art

Surface-emitting lasers are capable of high integration when being arranged in an array and therefore, are excellent in a mounting property on a substrate as compared with edge-emitting lasers. At present, various surface optical elements including surface-emitting lasers are used as key components in optical communication which requires large-capacity transmission or in optical information processing which requires high integration.

For example, in a down-sized optical radio transceiver, surface-emitting lasers are mounted on a built-in substrate in an array. Further, laser light emitted from the surface-emitting lasers is received by optical fibers arranged in an array in parallel with the substrate. In this case, a traveling direction of light within a module must be bent at 90°. For realizing this technique, the following optical system is conventionally proposed. That is, a mirror is obliquely arranged within a propagation path of light to bend the traveling direction of laser light emitted from the surface-emitting lasers so that the laser light can be optically coupled to optical fibers. However, the mirror used for the sake of the object is required to have high flatness or low surface roughness and therefore, manufacture of the mirror is not necessarily easy.

Conventionally, there is also proposed a technique of using an optical waveguide structure in place of the mirror. The structure includes a curved surface of which the cross section is curved in a circular arc shape and on which a propagation path (optical waveguide) of light is formed. In the structure, optical-coupling between surface optical elements and optical fibers, which are arranged almost orthogonally to each other, can be performed (see, e.g., Japanese Unexamined Patent Publication No. 2005-115346). In this proposal, the need for manufacture of mirrors and the need for an optical axis matching of components including the mirrors are eliminated by using the optical waveguide structure. Thus, facility of fabrication of optical modules is attained.

In the manufacture of optical modules, when assembling elements constituting the modules, such as an optical element, an optical fiber, or an optical waveguide structure provided between the optical element and the optical fiber, positioning of the elements becomes very important for obtaining a high optical-coupling efficiency.

With respect to the positioning in assembling the optical modules, for example, the following method is conventionally proposed. That is, when mounting an end-face light receiving-type optical element on a substrate where an optical waveguide is partially formed, an insulating layer is formed between the optical element and the substrate in order to adjust heights of optical axes in an optical waveguide core and an optical element active layer. Thus, a height of the optical element active layer from the substrate is controlled (see, e.g., Japanese Unexamined Patent Publication No. 2001-108871). Further, also the following method is proposed. That is, a tapered optical waveguide formed by using a silicone resin is sandwiched between an end light emitting type optical element and an optical fiber. Further, connection guides are provided on respective components to allow the components to be placed opposite and connected to each other. Thus, a relative displacement of the respective components or shape distortion in terminal areas accompanying a temperature change is suppressed to attain reduction in light loss (see, e.g., U.S. Pat. No. 3,059,171).

In addition to the above-described methods, there is considered a method where emitted light from an optical element or incident light to an optical element is focused using a lens. In this case, an interval between the optical element and the lens must be controlled near a focal length of the lens.

For the method for controlling the interval, for example, there is considered the following method. That is, surface optical elements are arranged on a substrate in an array. Further, an optical waveguide structure having lenses arranged in an array is used. A projection structure is previously formed on this optical waveguide structure. The projection is brought into contact with the substrate on which the surface optical elements are mounted. Thus, the intervals between the surface optical elements and the lenses are controlled to an interval according to a length of the projection. Alternatively, there is also considered the following method. That is, a spacer is provided between the optical waveguide structure and the substrate. Thus, the intervals between the surface optical elements and the lenses are controlled to an interval according to a thickness of the spacer.

However, even when using these methods, the following problem occurs. That is, when warpage occurs in the substrate itself or dispersion occurs in the thickness of a heat sink or adhesive layer which may be provided between the substrate and the optical elements, it is difficult to control the intervals between the optical elements and the lenses with high accuracy.

Further, the same problem may occur also in the case of controlling the intervals between the optical waveguide end faces of the optical waveguide structure and optical elements in the optical module using the optical waveguide structure, for example, in the optical module where light is directly exchanged between the optical waveguide structure and the optical elements without passing through the lenses, in addition to the case of controlling the intervals between the optical elements and the lenses as described above.

SUMMARY OF THE INVENTION

In view of the foregoing, it is an object of the present invention to provide an optical waveguide structure capable of easily and accurately keeping an interval between the optical waveguide structure and an optical element within a certain range.

Another object of the present invention is to provide an optical module where an interval between an optical waveguide structure and an optical element is accurately kept within a certain range.

Yet another object of the present invention is to provide a lens array capable of easily and accurately keeping an interval between the lens array and an optical element within a certain range.

To accomplish the above objects, according to one aspect of the present invention, there is provided an optical waveguide structure having an optical waveguide for propagating light. The optical waveguide structure includes a projection structure that, when an end face of the optical waveguide is arranged to oppose an optical element, comes in contact with the optical element such that an interval between the optical waveguide and the optical element is within a certain range.

According to another aspect of the present invention, there is provided an optical module, having a substrate, an optical element mounted on the substrate, and an optical waveguide structure having an optical waveguide for propagating light which enters the optical element or light which is emitted from the optical element. The optical waveguide structure has a projection structure that comes in contact with the optical element such that an interval between the optical waveguide structure and the optical element is within a certain range.

According to yet another aspect of the present invention, there is provided a lens array having lenses arranged in an array. The lens array has a projection structure that, when each of the lenses is arranged to oppose an optical element, comes in contact with the optical element such that an interval between each of the lenses and the optical element is within a certain range.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4A is a side view and FIG. 4B is a bottom view.

DESCRIPTION OF THE PREFERRED EMBODIMENTS

Figure 1:
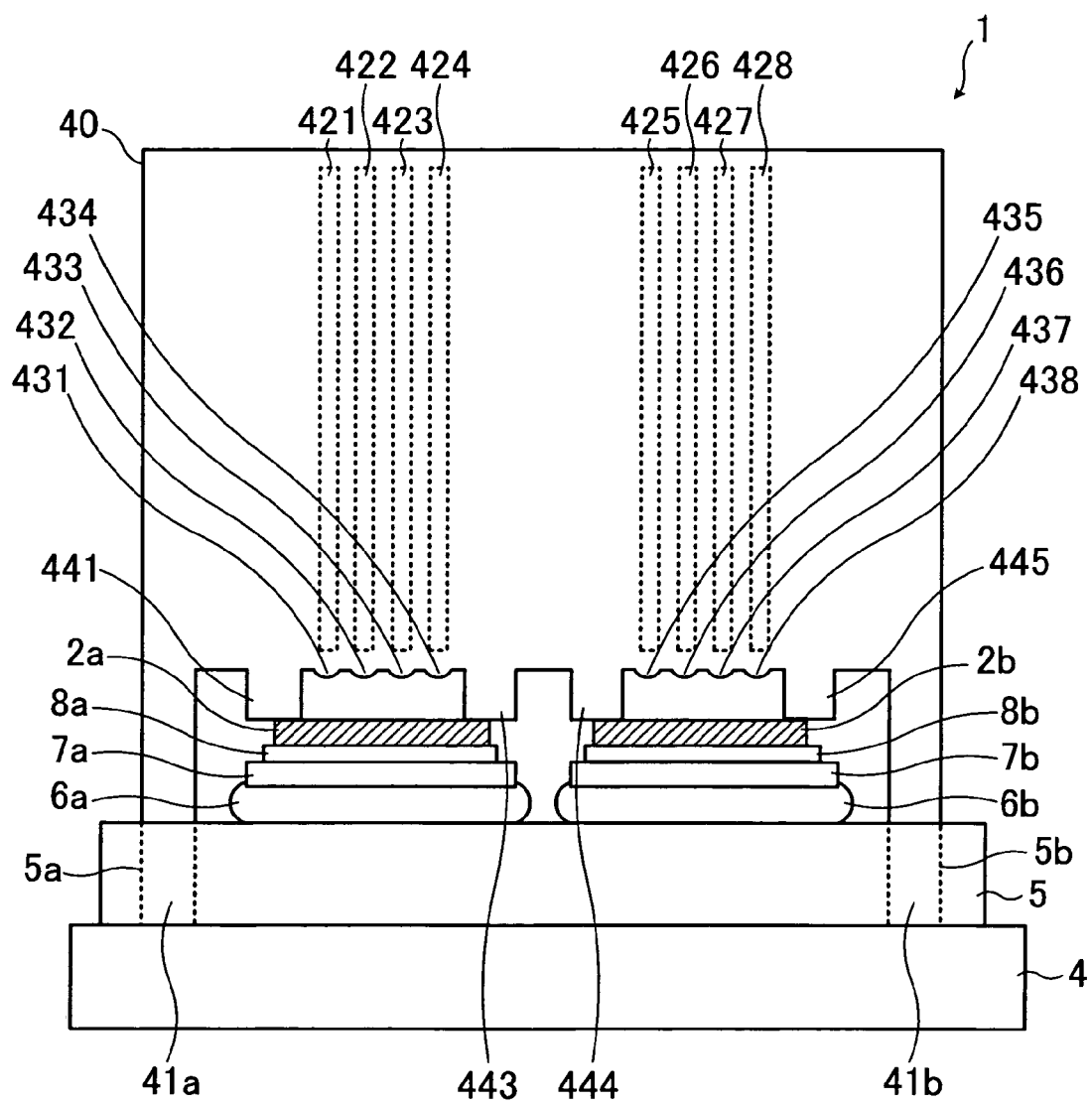
FIG. 1 is a schematic front view of an optical module.

Preferred embodiments of the present invention are described in detail below with reference to the accompanying drawings by taking as an example an optical module using an optical waveguide structure with lenses capable of bending a traveling direction of propagating light at an almost right angle, wherein like reference numerals refer to like elements throughout.

Figure 2:
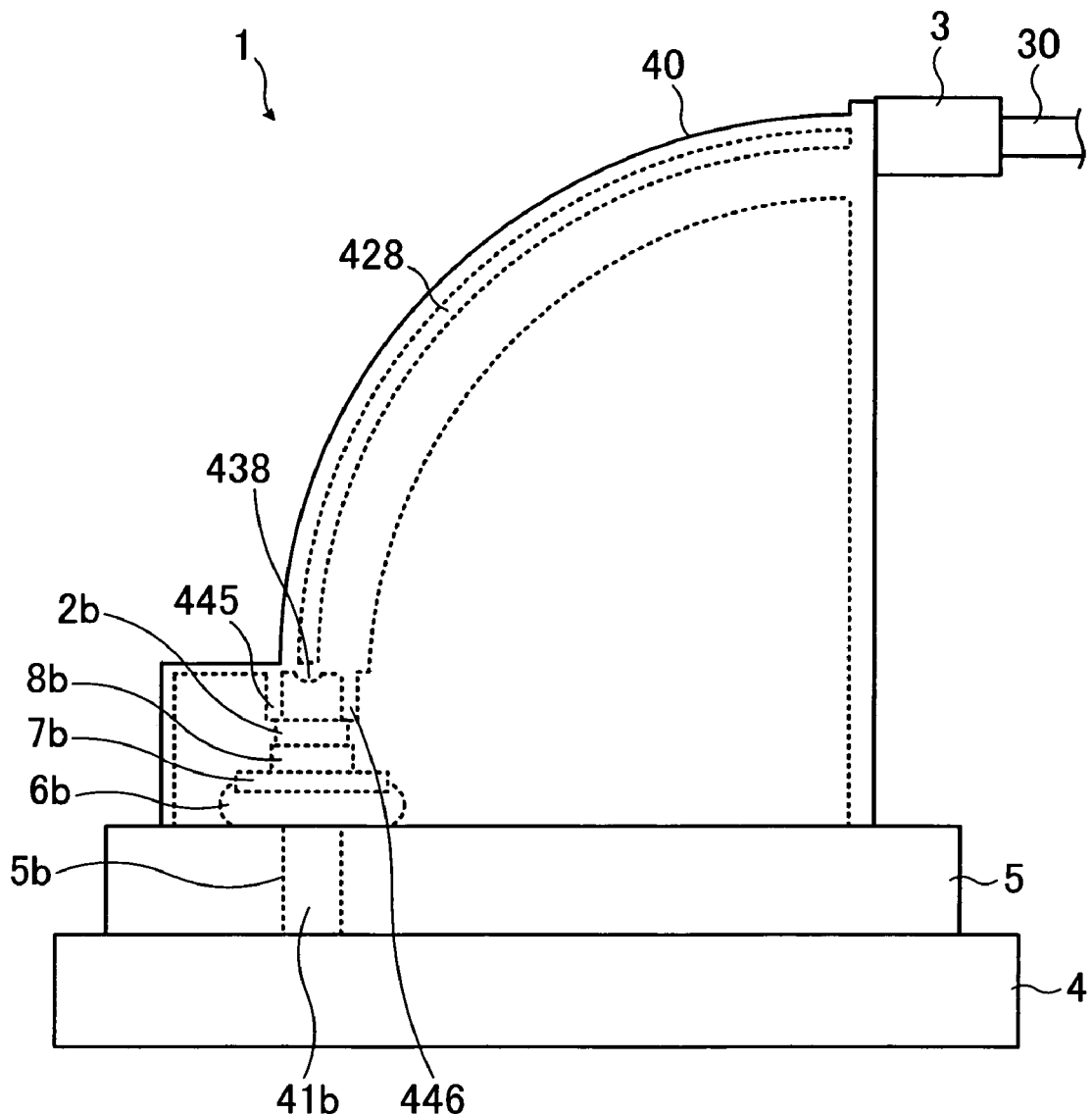
FIG. 2 is a schematic left side view of an optical module.
Figure 3:
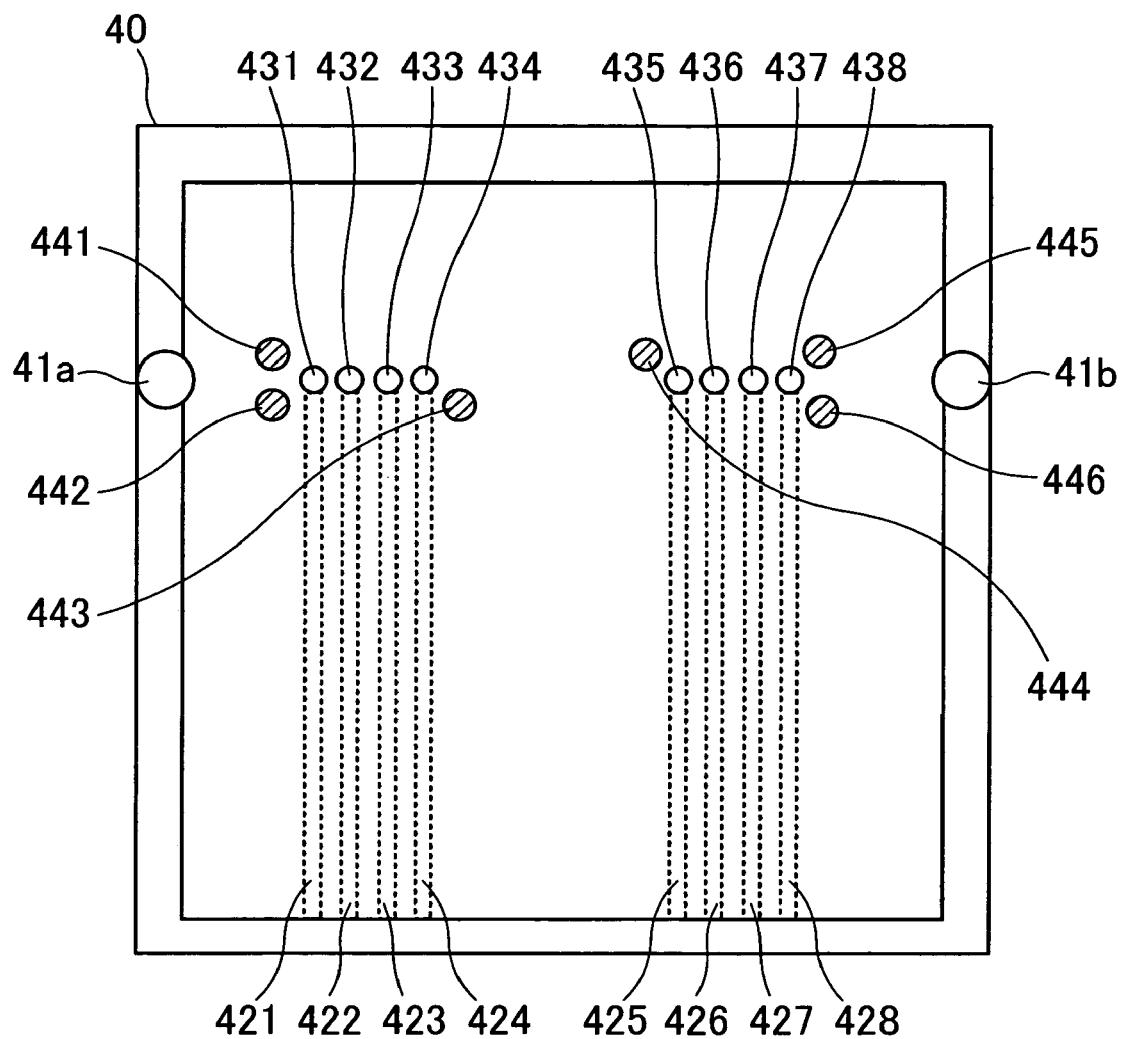
FIG. 3 is a schematic bottom view of an optical waveguide structure.

FIG. 1 is a schematic front view of an optical module. FIG. 2 is a schematic left side view of the module. FIG. 3 is a schematic bottom view of an optical waveguide structure.

An optical module 1 shown in FIGS. 1 and 2 has each of an array-like surface light emitting element 2a and surface light receiving element 2b one by one, for example, having four channels. Further, this optical module 1 has an optical waveguide structure 40 which guides light emitted from the surface light emitting element 2a to an optical fiber 30 connected through a connector 3 and which guides light propagating through the optical fiber 30 to the surface light receiving element 2b. Thus, the module 1 functions as a transmitting/receiving module.

On a horizontal positioning plate 5 provided on a substrate 4 of the optical module 1, elastic layers 6a and 6b, heat sinks 7a and 7b and conductive adhesive layers 8a and 8b are sequentially laminated and thereon, the surface light emitting element 2a and the surface light receiving element 2b are each arranged.

An FR-4 printed board can be used for the substrate 4. A soft elastic body having a small elastic modulus such as a silicone resin is used for the elastic layers 6a and 6b. A copper (Cu)-tungsten (W) alloy plate of which the whole surface is metalized by gold (Au) is used for the heat sinks 7a and 7b. An epoxy resin silver (Ag) paste is used for the conductive adhesive layers 8a and 8b.

As shown in FIGS. 1 to 3, the optical waveguide structure 40 has first projections 41a and 41b on the bottom. The first projections 41a and 41b are fitted in holes 5a and 5b provided in the positioning plate 5 to allow positioning in a horizontal direction (a plane direction of the substrate 4). In this state, the structure 40 is fixed on the substrate 4 side.

As shown in FIG. 2, the optical waveguide structure 40 has a curved surface of which the cross section in the vertical direction to the substrate 4 surface is curved in a circular arc shape when fixing the structure 40 on the positioning plate 5 on the substrate 4. On a convex side of the curved surface, the structure 40 has eight optical waveguides 421, 422, 423, 424, 425, 426, 427 and 428 formed in an array. Each of the optical waveguides 421, 422, 423, 424, 425, 426, 427 and 428 serves as a light propagation path within the optical waveguide structure 40. Further, each of the waveguides is configured by interposing a core portion having a predetermined refractive index between clad portions having a refractive index lower than that of the core portion.

For example, the optical waveguide structure 40 is realized as follows. On a convex side of a first clad portion formed to have a curved surface of which the cross section in the vertical direction to the substrate 4 surface is curved in a circular arc shape, a groove extending in a curved direction of the curved surface is formed. Then, a core portion having a refractive index higher than that of the first clad portion is formed in the groove. Thereafter, a second clad portion is formed so as to cover the first clad portion and the core portion.

Further, lenses 431, 432, 433 and 434 are formed near end faces of the optical waveguides 421, 422, 423 and 424 on the surface light emitting element 2a side, respectively. Similarly, lenses 435, 436, 437 and 438 are formed near end faces of the optical waveguides 425, 426, 427 and 428 on the surface light receiving element 2b side, respectively. When fixing the optical waveguide structure 40 on the substrate 4 side, the lenses 431, 432, 433 and 434 are arranged above the surface light emitting element 2a and the lenses 435, 436, 437 and 438 are arranged above the surface light receiving element 2b. Further, end faces of the respective optical waveguides 421, 422, 423, 424, 425, 426, 427 and 428 on the optical fiber 30 side are arranged to face almost in parallel direction to the substrate 4 surface.

When using the optical waveguide structure 40 having the configuration as described above, use of mirrors is unnecessary. The structure 40 can guide light emitted from the surface light emitting element 2a to the optical fiber 30 while bending a traveling direction of the light at 90°. On the other hand, the structure 40 can guide light propagating through the optical fiber 30 to the surface light receiving element 2b while bending a traveling direction of the light at 90°.

Further, as shown in FIGS. 1 to 3, the structure 40 has second projections 441, 442, 443, 444, 445 and 446 of which the end faces come in contact with the surface light emitting element 2a and the surface light receiving element 2b when fixing the structure 40 on the substrate 4 side. As shown in FIG. 3, the second six projections 441, 442, 443, 444, 445 and 446 are formed in a region other than the formation region of the lenses 431, 432, 433, 434, 435, 436, 437 and 438.

Figure 4A:
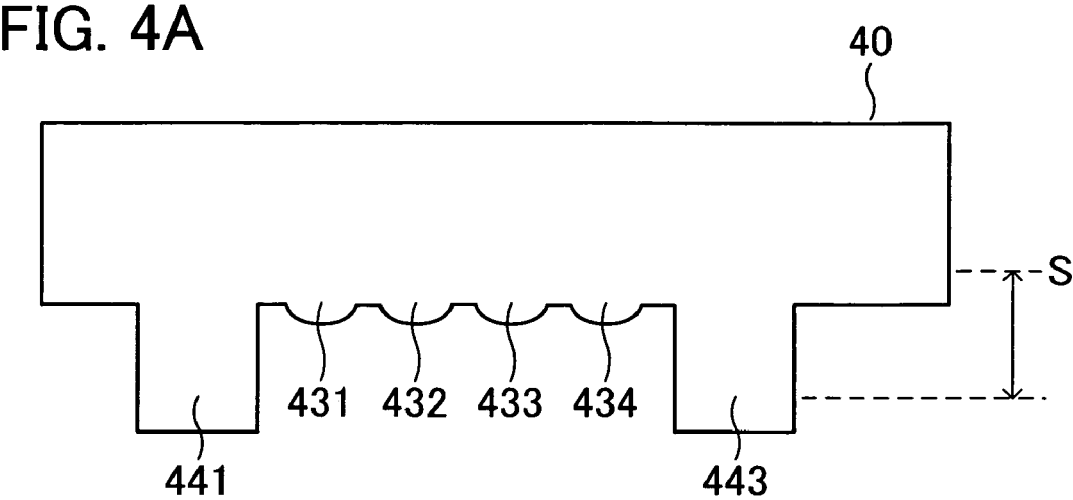
FIGS. 4A and 4B are enlarged views near lenses of an optical waveguide structure.
Figure 4B:
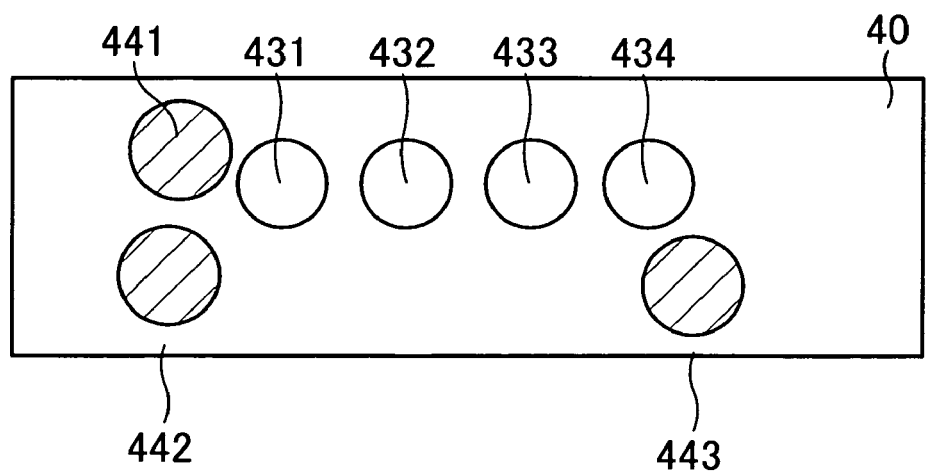

FIGS. 4A and 4B are enlarged views near the lenses of the optical waveguide structure. FIG. 4A is a side view, and FIG. 4B is a bottom view.

As shown in FIGS. 4A and 4B, for example, the second projections 441, 442 and 443 of which the end faces come in contact with the surface light emitting element 2a are formed in the region near the lenses 431, 432, 433 and 434. Further, each of the second projections 441, 442 and 443 is formed to a length that the end face of each second projection comes in contact with the surface light emitting element 2a and a length (a height from the reference surface S) that a focal length of each of the lenses 431, 432, 433 and 434 is taken into consideration when fixing the optical waveguide structure 40 on the substrate 4 side.

Figure 5:
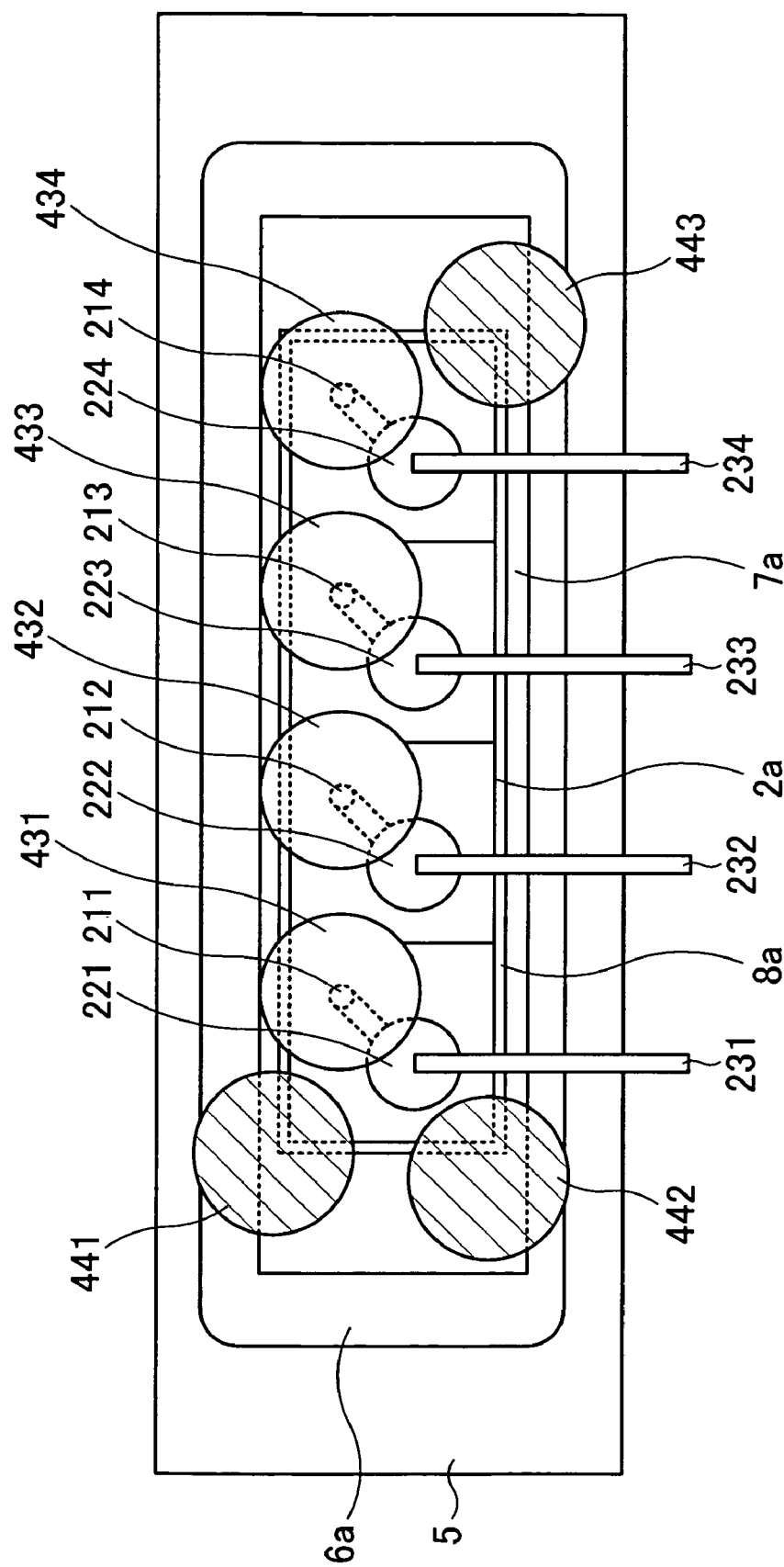
FIG. 5 shows a positional relationship near lenses of an optical waveguide structure.

FIG. 5 shows a positional relationship near the lenses of the optical waveguide structure.

First, description is made by taking as an example the surface light emitting element 2a. In the optical module 1, the elastic layer 6a, the heat sink 7a and the conductive adhesive layer 8a are sequentially laminated and formed on the positioning plate 5 and thereon, the surface light emitting element 2a having four channels is arranged, as described in the foregoing pages.

At the portions corresponding to respective channels, the surface light emitting element 2a has light emitting portions 211, 212, 213 and 214 each serving as a light emitting port as well as electrodes 221, 222, 223 and 224. Using wire bonding, wirings 231, 232, 233 and 234 are bonded to the electrodes 221, 222, 223 and 224, respectively.

In the optical waveguide structure 40, the lenses 431, 432, 433 and 434 are arranged immediately above the light emitting portions 211, 212, 213 and 214, respectively. Further, the second projections 441, 442 and 443 are formed in a predetermined dimension (a diameter and a height from the reference surface S) and a shape (a cylindrical shape herein) so as to be arranged at the positions where the end faces of the second projections come in contact with the surface light emitting element 2a while avoiding the electrodes 221, 222, 223 and 224 or wirings 231, 232, 233 and 234 in addition to the light emitting portions 211, 212, 213 and 214.

In the optical waveguide structure 40, the second projections 441, 442 and 443 are brought into contact with the surface light emitting element 2a. Further, the intervals between the light emitting portions 211, 212, 213 and 214, and the lenses 431, 432, 433 and 434 are kept to lengths corresponding to those of the projections 441, 442 and 443 by an elastic force of the elastic layer 6a provided below the surface light emitting element 2a.

Further, stress occurring between the second projections 441, 442 and 443, and the surface light emitting element 2a when the second projections 441, 442 and 443 are brought into contact with the surface light emitting element 2a is dispersed by the elastic layer 6a. As a result, the surface light emitting element 2a is prevented from being broken. The intervals between the light emitting portions 211, 212, 213 and 214, and the lenses 431, 432, 433 and 434 may be kept within a certain range by the second projections 441, 442 and 443 without particularly providing the elastic layer 6a. However, in order to prevent the breakage of the element 2a due to the stress, it is desired to provide the elastic layer 6a as described above.

According to the optical waveguide structure 40, the intervals between the light emitting portions 211, 212, 213 and 214, and the lenses 431, 432, 433 and 434 are kept within a certain range without inhibiting light emission from the surface light emitting element 2a. Therefore, light emitted from the surface light emitting element 2a can be focused on the lenses 431, 432, 433 and 434 with high efficiency.

In the above FIGS. 4A, 4B and 5, description is made by taking as an example the surface light emitting element 2a side. Further, the same is equally true of the surface light receiving element 2b side. More specifically, the second projections 444, 445 and 446 on the surface light receiving element 2b side of the optical waveguide structure 40 are formed in the region near the lenses 435, 436, 437 and 438. Further, the second projections 444, 445 and 446 are formed in a predetermined dimension (a diameter and a height from the reference surface S) and a shape (a cylindrical shape herein) so as to be arranged at the positions where the end faces of the second projections come in contact with the surface light receiving element 2b while avoiding the light receiving portions or electrodes of the element 2b, and electrode wirings.

According to the light waveguide structure 40, the intervals between the light receiving portions of the surface light receiving element 2b, and the lenses 435, 436, 437 and 438 are kept within a certain range without inhibiting light from entering the element 2b. Therefore, light from the optical fiber 30 is allowed to enter the surface light receiving element 2b through the lenses 435, 436, 437 and 438 with high efficiency.

Subsequently, a formation method of the optical module 1 having the above-described configuration is described with reference to concrete examples.

An FR-4 printed board having a thickness of about 1.6 mm is used as the substrate 4. On the substrate 4, the positioning plate 5 having holes 5a and 5b with a diameter of about 1 mm is first adhered using an adhesive. More specifically, using an epoxy resin adhesive, the plate 5 is adhered and fixed on the substrate 4 by heat-curing the adhesive in an atmosphere of nitrogen ($N_2$) under curing conditions at a temperature of about 100° C. for about 40 minutes.

Next, at predetermined positions on the positioning plate 5, the elastic layers 6a and 6b are formed as follows. For example, about 0.15 µL of a two-component heat curing epoxy resin is dropped on each of two regions on which the surface light emitting element 2a and the surface light receiving element 2b are to be mounted by an automatic dispenser. Then, the resin is heat-cured in an atmosphere of $N_2$ under curing conditions at a temperature of about 100° C. for about 1 hour. As a result, the elastic layers 6a and 6b each having a length of about 0.5 mm, a width of about 1.5 mm and a thickness of about 0.2 mm are formed on the cured positioning plate 5.

Next, using a die bonder, the Cu—W alloy-base heat sinks 7a and 7b of which the whole surfaces are metalized with Au and which each have a length of about 0.4 mm, a width of about 1.4 mm and a height of about 0.4 mm are mounted on the elastic layers 6a and 6b, respectively. On this occasion, an adhesive (resin) composed of the same material as that in the elastic layers 6a and 6b is used for the adhesion of the heat sinks 7a and 7b. Curing of the adhesive is performed under the same conditions as those in forming the elastic layers 6a and 6b. Thus, the heat sinks 7a and 7b are adhered on the elastic layers 6a and 6b, respectively.

Next, the epoxy resin Ag paste as the conductive adhesive layers 8a and 8b is coated on the heat sinks 7a and 7b, respectively. Then, the surface light emitting element 2a and surface light receiving element 2b which each have four channels and in which elements are arranged at a pitch of 250 μm are mounted on the layers 8a and 8b, respectively. On this occasion, using the dispenser, the Ag paste as the conductive adhesive layers 8a and 8b is coated on the heat sinks 7a and 7b, respectively. Then, the surface light emitting element 2a and the surface light receiving element 2b are arranged on the layers 8a and 8b, respectively. Using a clean oven, the paste is heat-cured in an atmosphere of $N_2$ under the curing conditions at a temperature of about 150° C for about 5 minutes. The heat-curing may be performed by pulse heating in the atmosphere using a die bonder capable of heating the substrate 4.

Next, the structure 40 is adhered and fixed on the positioning plate 5 by fitting the first projections 41a and 41b in the holes 5a and 5b.

Herein, the structure 40 is formed, for example, by the following procedures. First, transparent clad materials, for example, thermoplastic resins such as polyolefin-base resins are filled in a predetermined injection mold and subjected to an injection molding. Thus, the first clad portion having a curved surface is formed. On the first clad portion, there are formed eight grooves which extend in a curved direction and in which the core portion is formed, the lenses 431, 432, 433, 434, 435, 436, 437 and 438, the first projections 41a and 41b, and the second projections 441, 442, 443, 444, 445 and 446.

Further, since the inside of the first clad portion is hollowed out, weight saving and cost reduction are attained and at the same time, the surface light emitting element 2a and the surface light receiving element 2b are stored in the space. Next, on the convex of the first clad portion, an appropriate quantity of liquid core materials, for example, liquid UV-curing resins such as epoxy resins or acrylic resins is dropped using a dispenser. Further, a film as a second clad portion composed of clad materials having a refractive index equal to that of the first clad portion is stuck on this convex. Then, the film is pressed down from above at a certain pressure. In this state, ultraviolet light is irradiated to cure the liquid core materials to form the core portion. Thus, the optical waveguides 421, 422, 423, 424, 425, 426, 427 and 428 are formed. As a result, the optical waveguide structure 40 is formed.

When adhering and fixing the thus formed structure 40 on the positioning plate 5 by fitting the first projections 41a and 41b in the holes 5a and 5b, a load of 1 g or more is applied while monitoring a load during the fitting. In this state, the structure 40 and the plate 5 are adhered using UV-curing resins. As a result, the structure 40 is fixed on the positioning plate 5 and the substrate 4 in a state where the second projections 441, 442 and 443 are brought into contact with three points of the surface light emitting element 2a and the second projections 444, 445 and 446 are brought into contact with three points of the surface light receiving element 2b.

As an example herein, assume a case where optical-coupling between the surface light emitting elements which have four channels and which are arranged at a pitch of 250 μm, and a lens array which has four channels and which comprises lenses each having a curvature radius of 130 μm is performed to allow focused laser light to enter the optical waveguide. In this case, an ideal interval of 280 μm between the surface light emitting elements and the lens array must be controlled to a range of ±20 μm in order to obtain an optical output of −0.5 dB for the maximum optical intensity of the laser light coupled to the optical waveguide.

The structure 40 is herein formed to have a configuration described below. That is, the second projections 441, 442, 443, 444, 445 and 446 each have a cylindrical shape with a diameter of about 0.2 mm and a height from the reference level S (refer to FIG. 4) of about 0.33 mm. Further, the lenses 431, 432, 433 and 434 each having a curvature radius of 130 μm, which are formed in an array, are arranged above the surface light emitting element 2a. Similarly, the lenses 435, 436, 437 and 438 each having a curvature radius of 130 μm, which are formed in an array, are arranged above the surface light receiving element 2b.

When fixing the structure 40 having the above configuration on the positioning plate 5 and the substrate 4 according to the above procedures, the following advantages can be obtained. That is, a deviation from an ideal value of the intervals between the light emitting portions 211, 212, 213 and 214, and lenses 431, 432, 433 and 434 in each channel of the surface light emitting element 2a as well as a deviation from an ideal value of the intervals between the light receiving portions and lenses 435, 436, 437 and 438 in each channel of the surface light receiving element 2b can be controlled within a range of dimensional tolerances in the second projections 441, 442, 443, 444, 445 and 446, and further within a range of ±20 μm.

The optical module 1 formed by using the above method is subjected to a thermal cycle test using 1230H produced by Three Bond Co., Ltd. as a material for the elastic layers 6a and 6b. The thermal cycle test is performed as follows. That is, a temperature increasing/decreasing cycle from −40° C. to +85° C. is repeated 100 times while keeping a temperature of −40° C. for one hour and a temperature of +85° C. for one hour. Each penetration of the elastic layers 6a and 6b before and after the thermal cycle test is measured under the same conditions. As a result, it is found that a change of the penetrations before and after the thermal cycle test is about 5%.

Accordingly, even when volume reduction due to deterioration of the gelatinous elastic layers 6a and 6b occurs by long-term use of the optical module 1, a change of the layer thickness is about 10 μm when each thickness of the elastic layers 6a and 6b is 0.2 mm. Therefore, effects on the interval control between the surface light emitting element 2a and the lenses 431, 432, 433 and 434 as well as between the surface light receiving element 2b and the lenses 435, 436, 437 and 438 are scarcely exerted.

When using an elastic body having relatively large aging deterioration for the elastic layers 6a and 6b, fixing between the second projections 441, 442 and 443 and the heat sink 7a as well as between the second projections 444, 445 and 446 and the heat sink 7b may be performed using an adhesive.

Figure 6:
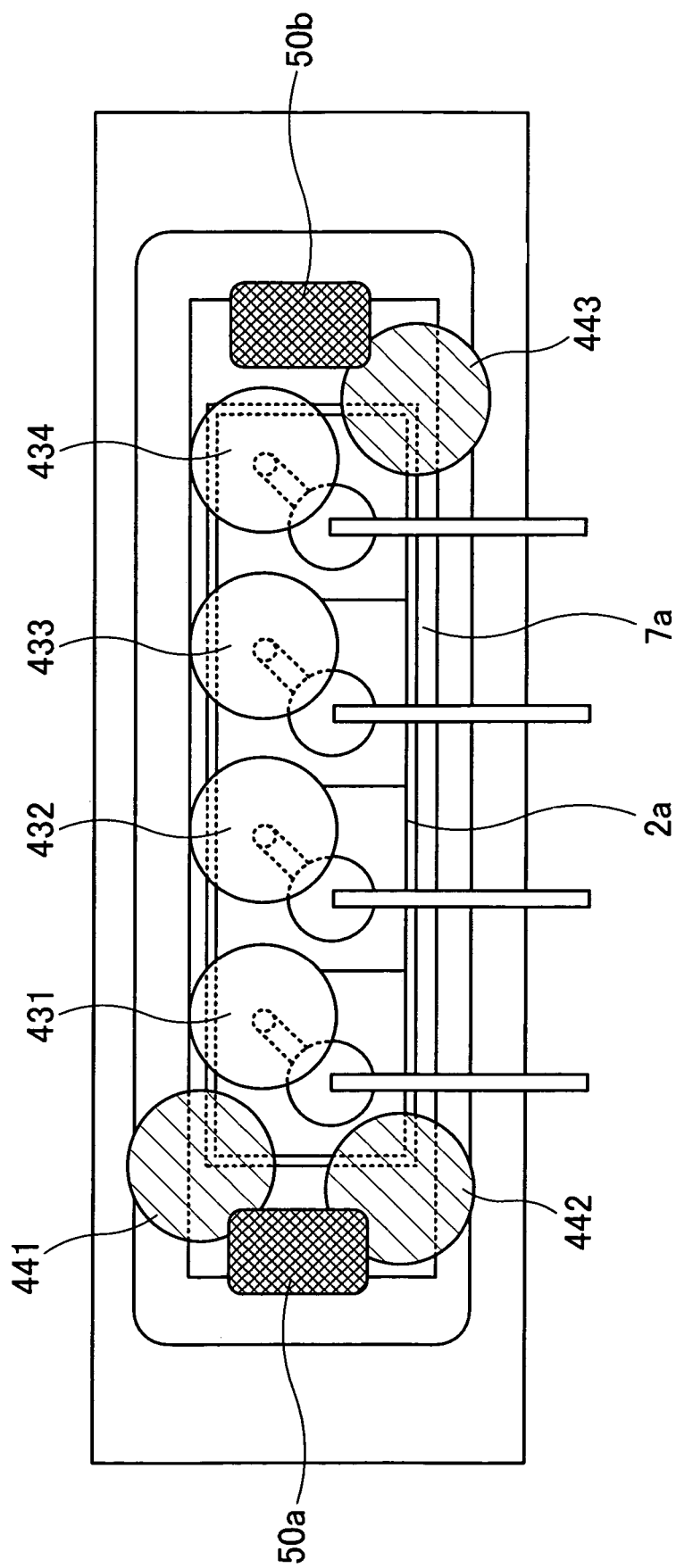
FIG. 6 is an illustration in the case of performing fixing between second projections and heat sinks.

FIG. 6 is an illustration in the case of performing the fixing between the second projections and the heat sinks. In FIG. 6, the same elements as those in FIG. 5 are indicated by the same reference numerals as in FIG. 5 and their descriptions are omitted.

Description is made, for example, by taking as an example the surface light emitting element 2a side. In FIG. 6, a positional relationship among the surface light emitting element 2a, the lenses 431, 432, 433 and 434, and the second projections 441, 442 and 443 is the same as that shown in FIG. 5. In FIG. 6, connection between the second projections 441 and 442 that are brought into contact with the surface light emitting element 2a, and the heat sink 7a that is provided below the surface light emitting element 2a is performed by an adhesive 50a. Similarly, connection between the second projection 443 and the heat sink 7a is performed by an adhesive 50b. For the adhesives 50a and 50b, for example, the UV-curing adhesive can be used.

Figure 7:
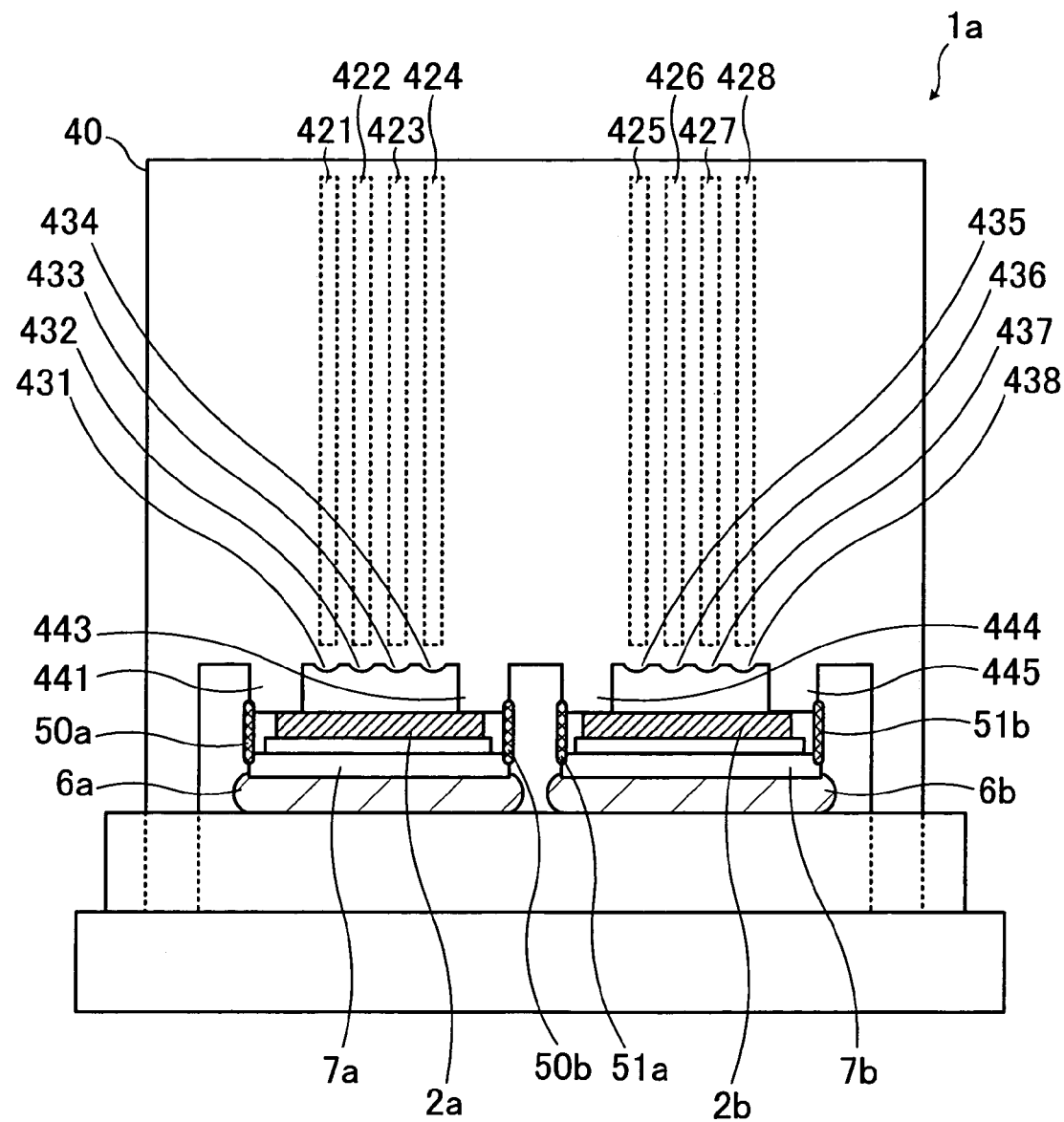
FIG. 7 is a front view of an optical module in the case of performing fixing between second projections and heat sinks using an adhesive.

FIG. 7 is a front view of the optical module formed by performing the fixing between the second projections and the heat sinks using an adhesive. In FIG. 7, the same elements as those in FIG. 1 are indicated by the same reference numerals as in FIG. 1 and their descriptions are omitted.

In the optical module la shown in FIG. 7, the fixing by the adhesives 50a and 50b as shown in FIG. 6 is performed also for the surface light receiving element 2b side. Specifically, connection between the second projection 444 and the heat sink 7b is performed by the adhesive 51a. Connection between the second projections 445 and 446 (in FIG. 7, only the second projection 445 is shown), and the heat sink 7b is performed by the adhesive 51b.

As described above, when performing the connection and fixing between the second projections 441, 442 and 443,and the heat sink 7a by the adhesives 50a and 50b as well as between the second projections 444, 445 and 446, and the heat sink 7b by the adhesives 51a and 51b, the following advantages can be obtained. That is, even when the elastic layers 6a and 6b are composed of materials which deteriorate relatively easily, both of the intervals between the lenses 431, 432, 433 and 434, and the surface light emitting element 2a, and the intervals between the lenses 435, 436, 437 and 438, and the surface light receiving element 2b can be kept within a certain range. Therefore, even when using the optical module la for a long period of time, light emitted from the surface light emitting element 2a can be focused on the lenses 431, 432, 433 and 434 with high efficiency and guided into the optical waveguides 421, 422, 423 and 424. Further, light propagating through the optical waveguides 425, 426, 427 and 428 is allowed to enter the surface light receiving element 2b through the lenses 435, 436, 437 and 438 with high efficiency.

Such a fixing method using the adhesives 50a, 50b, 51a and 51b is similarly applicable not only to a configuration where elastic bodies having relatively large aging deterioration are used for the elastic layers 6a and 6b but also to a configuration where elastic bodies scarcely having aging deterioration are used for the elastic layers 6a and 6b.

As described above, the optical modules 1 and 1a are formed to have a configuration as follows. That is, the elastic layer 6a is provided between the substrate 4 and the surface light emitting element 2a mounted on the substrate 4 as well as the elastic layer 6b is provided between the substrate 4 and the surface light receiving element 2b mounted on the substrate 4. At the same time, on the optical waveguide structure 40 having the lenses 431, 432, 433, 434, 435, 436, 437 and 438, the second projections 441, 442, 443, 444, 445 and 446 that are brought into contact with the surface light emitting element 2a and the surface light receiving element 2b are provided in addition to the first projections 41a and 41b for the positioning in the horizontal direction.

As a result, the following advantages can be obtained. That is, the intervals between the lenses 431, 432, 433 and 434, and the surface light emitting element 2a as well as between the lenses 435, 436, 437 and 438, and the surface light receiving element 2b can be kept within a certain range. Therefore, light exchange between the optical waveguide structure 40 and the surface light emitting element 2a as well as between the optical waveguide structure 40 and the surface light receiving element 2b can be performed with high efficiency. Further, stress occurring in the surface light emitting element 2a and the surface light receiving element 2b due to the contact can be dispersed by the elastic layers 6a and 6b provided in the lower layer. Therefore, the surface light emitting element 2a and the surface light receiving element 2b can be prevented from being broken due to the excessive stress.

Figure 8:
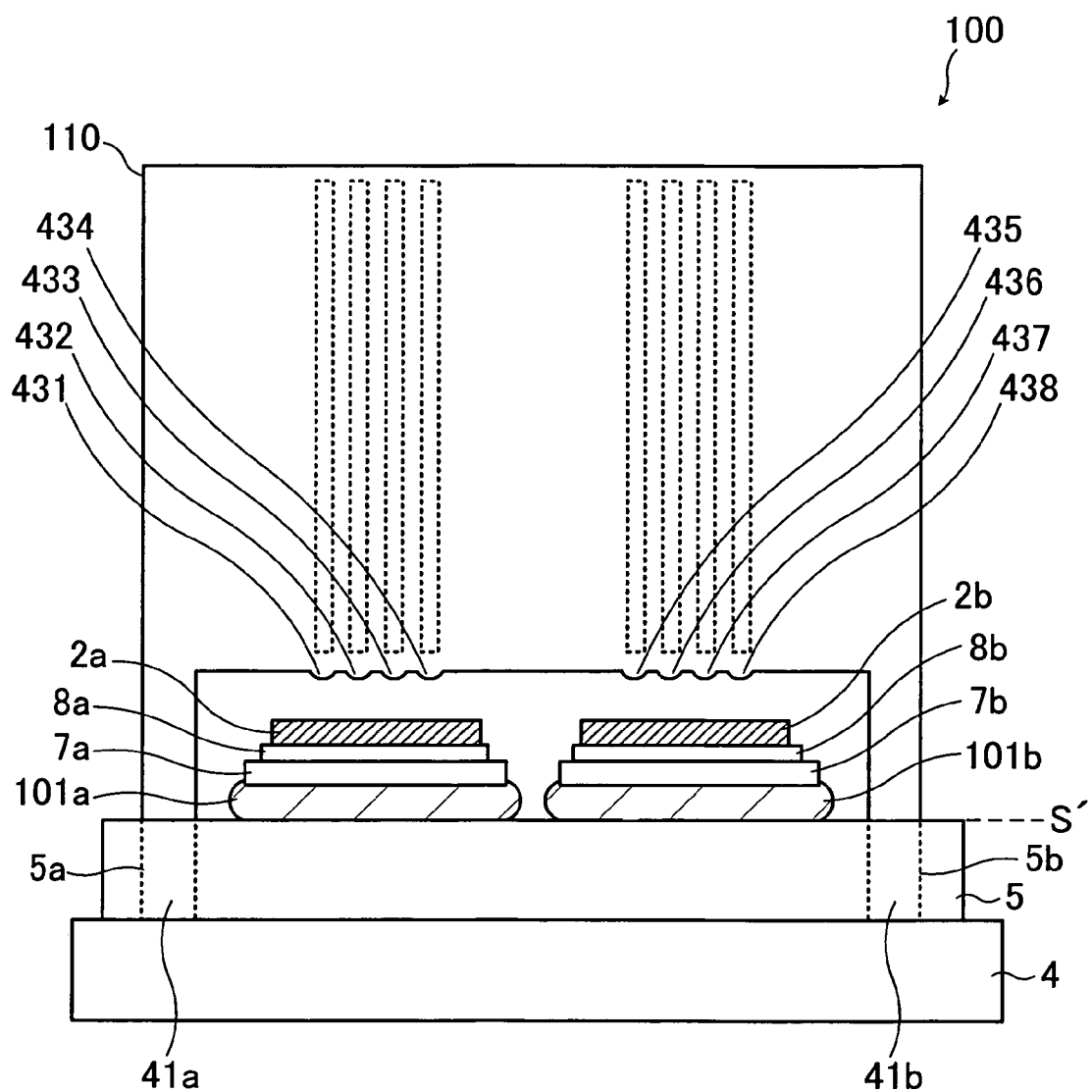
FIG. 8 is a schematic front view of an optical module having no second projection.
Figure 9:
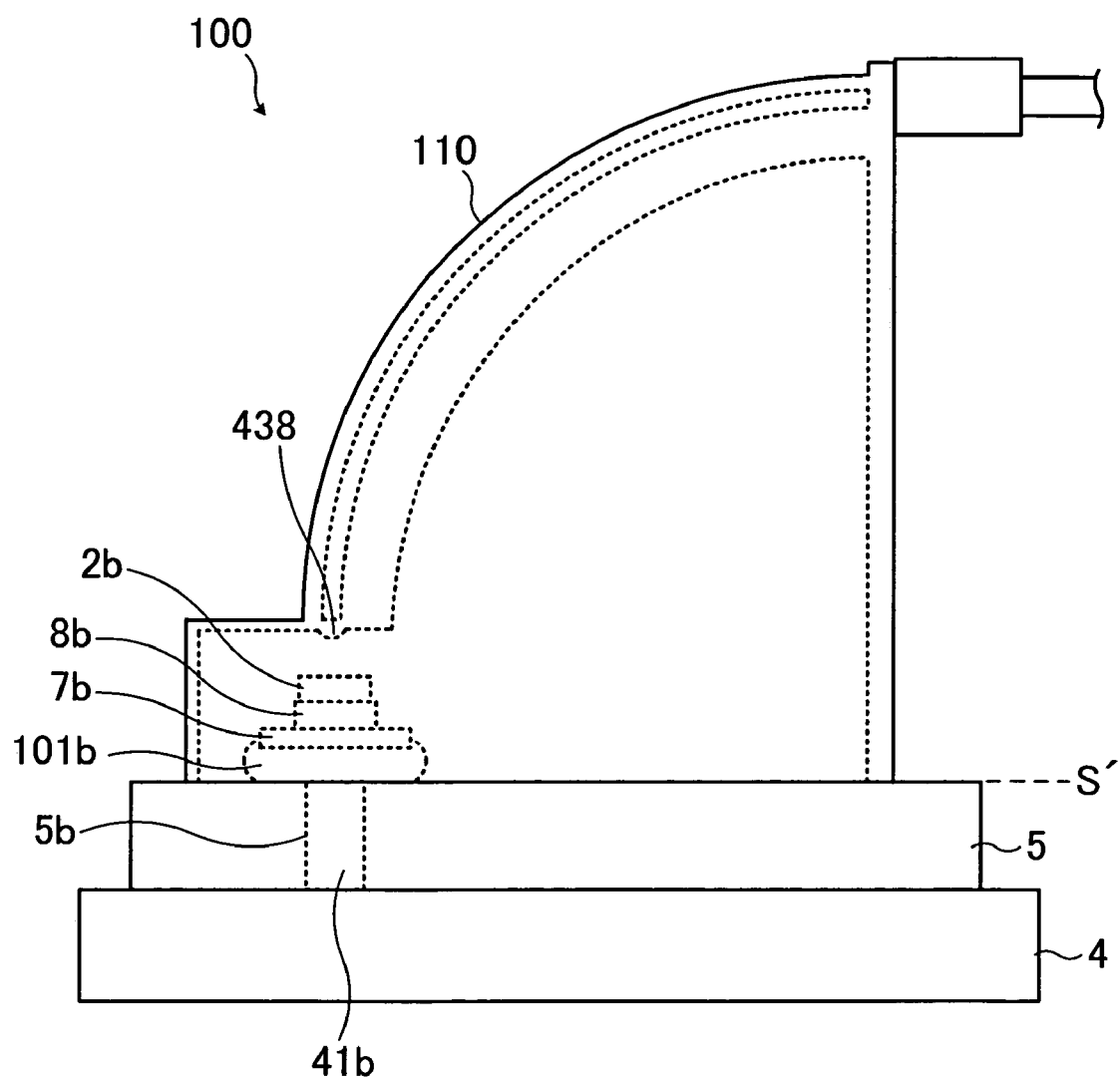
FIG. 9 is a schematic left side view of an optical module having no second projection.

FIG. 8 is a schematic front view of the optical module having no second projection. FIG. 9 is a schematic left side view of the optical module having no second projection. In FIGS. 8 and 9, the same elements as those in FIGS. 1 and 2 are indicated by the same reference numerals as in FIGS. 1 and 2, and their descriptions are omitted.

When forming the module 100 which does not have the second projections 441, 442, 443, 444, 445 and 446 as shown in FIGS. 1 and 2, the following procedures are taken. As shown in FIGS. 8 and 9, for example, epoxy resin adhesive layers 101a and 101b, the heat sinks 7a and 7b, and the conductive adhesive layers 8a and 8b are sequentially laminated and formed on the positioning plate 5 provided on the substrate 4. Thereon, the surface light emitting element 2a and the surface light receiving element 2b are each arranged. Further, the first projections 41a and 41b for the positioning in the horizontal direction of the optical waveguide structure 110 having no second projection are fitted in the holes 5a and 5b provided on the positioning plate 5. As a result, the optical waveguide structure 110 is adhered and fixed on the substrate 4 side.

In the optical module 100 having such a configuration, the positions in the height direction of the surface light emitting element 2a and the surface light receiving element 2b are determined based on an upper surface of the positioning plate 5 as a reference surface S'. The positions in the height direction vary depending on the warpage of the positioning plate 5 or the substrate 4 as well as depending on the thickness tolerances in the epoxy resin adhesive layers 101a and 101b, the heat sinks 7a and 7b, the conductive adhesive layers 8a and 8b, and the surface light emitting element 2a and the surface light receiving element 2b. Accordingly, the thickness tolerance or the warpage takes the form of deviation in the intervals between the lenses 431, 432, 433 and 434 of the optical waveguide structure 110, and the surface light emitting element 2a as well as between the lenses 435, 436, 437 and 438 of the structure 110, and the surface light receiving element 2b. Therefore, a precise interval control may be difficult.

On the contrary, the optical modules 1 and 1a are each formed to have a configuration as follows. As shown in FIGS. 1 to 7, the elastic layers 6a and 6b are provided and at the same time, the second projections 441, 442, 443, 444, 445 and 446 are provided on the optical waveguide structure 40. Therefore, the intervals between the lenses 431, 432, 433 and 434, and the surface light emitting element 2a as well as between the lenses 435, 436, 437 and 438, and the surface light receiving element 2b can be kept within a certain range. Further, the stress occurring at the time of the contact is dispersed so that breakage of the surface light emitting element 2a and the surface light receiving element 2b can be prevented.

In the above description, the second three cylindrical projections 441, 442 and 443 are brought into contact with the one surface light emitting element 2a. Similarly, the second other three cylindrical projections 444, 445 and 446 are brought into contact with the another surface light receiving element 2b. Further, the shape, number and formation position of the projections can be arbitrarily changed depending on the shape of the surface optical elements to be mounted.

In the above description, not only the eight optical waveguides 421, 422, 423, 424, 425, 426, 427 and 428 but also the eight lenses 431, 432, 433, 434, 435, 436, 437 and 438 are provided on the optical waveguide structure 40. Further, also the number of the optical waveguides or the number of the lenses can be arbitrarily changed depending on the shape of the surface optical elements to be mounted.

In the optical waveguide structure 40, the lenses 431, 432, 433, 434, 435, 436, 437 and 438 are provided on the sides of the surface light emitting elements 2a and 2b. Further, the lenses may be provided also on the side to be connected with the connector 3. Alternatively, no lens may be provided on any side. When forming the above-described projection structure, the interval between the optical waveguide structure and the surface optical element can be kept within a certain range. In addition, an optical waveguide having a tapered structure or a slab optical waveguide may also be formed on the optical waveguide structure 40.

In the above example, the FR-4 printed board is used for the substrate 4. Further, other types of substrates such as a glass epoxy substrate, a ceramic substrate, a glass substrate and a silicon substrate may be used for the substrate 4. A material used for the elastic layers 6a and 6b is not limited to the above silicone resin and can be arbitrarily selected in view of an elastic modulus, productivity or quality. In the above example, various adhesives are used. As long as not impairing the function or performance of the optical modules 1 and 1a, the adhesive type is not particularly limited.

In the above example, description is made by taking as an example the optical modules 1 and 1a configured as a transmitting and receiving module. Further, the optical modules 1 and 1a may be configured by mounting only the surface light emitting element as a surface optical element to form a transmitting module. Alternatively, the optical modules 1 and 1a may be configured by mounting only the surface light receiving element as a surface optical element to form a receiving module. Also in these cases, the same effect can be obtained by using an optical waveguide structure having the same configuration as that of the optical waveguide structure 40.

The number of the surface optical elements is not limited to two pieces. Further, also the configuration of the optical waveguide structure 40 (the number of optical waveguides or the number of lenses) can be arbitrarily changed depending on the number of the surface optical elements.

In the above, description is made by taking as an example the optical waveguide structure 40 having the lenses 431, 432, 433, 434, 435, 436, 437 and 438 capable of bending the traveling direction of propagating light at about 90°. In addition, even in a case of using an optical waveguide structure having another configuration, for example, having a configuration incapable of bending the traveling direction of light at 90°, when the elastic layer is provided on the surface optical element side and a projection structure for the contact to the surface optical element is provided on the optical waveguide structure side, the same effect can be obtained. Further, also when the elastic layer is provided on the surface optical element side and the projection structure for the contact to the surface optical element is similarly provided on a part of the lens array, the same effect can be obtained.

In the above description, the optical waveguide structure of the present invention is applied to the optical module using the surface optical element. Further, the structure of the present invention is similarly applicable to the optical module using optical elements having various other shapes.

In the present invention, the optical waveguide structure having an optical waveguide for propagating light comprises a projection structure that, when an end face of the optical waveguide is arranged to oppose an optical element, comes in contact with the optical element such that an interval between the optical waveguide and the optical element is within a certain range. Therefore, for example, even when warpage occurs in a substrate where an optical element is mounted, the interval between the optical waveguide structure and the optical element can be surely kept within a certain range. As a result, light exchange between the optical waveguide structure and the optical element can be effectively performed.

Further, when providing the projection structure as described above, manufacture of various optical modules including a compact optical transceiver is especially facilitated. As a result, yield improvement and cost reduction can be realized.

Further, when providing the elastic layer on the side opposite the side where the optical element comes in contact with the projection structure provided on the optical waveguide structure, the stress occurring when the projection structure comes in contact with the optical element can be dispersed. As a result, breakage of the optical element can be surely prevented.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical module, comprising:
   a substrate;
   a positioning plate provided on the substrate;
   an elastic layer provided on the positioning plate;
   an opto-electronic element arranged over the elastic layer; and
   an optical waveguide structure arranged over the substrate and having an optical waveguide for propagating light which enters the opto-electronic element or light which is emitted from the opto-electronic element,
   wherein:
   the optical waveguide structure has first projections fitted in holes provided in the positioning plate, and second projections coming into direct contact with the opto-electronic element and pressing the opto-electronic element to the elastic layer;
   the second projections come into direct contact with the opto-electronic element such that an interval between the optical waveguide structure and the opto-electronic element is within a certain range.

2. The optical module according to claim 1, wherein:
   the optical waveguide structure has a lens integrally arranged at a position opposite the opto-electronic element, and
   the second projections come into direct contact with the opto-electronic element such that an interval between the lens and the opto-electronic element is within a certain range.

3. The optical module according to claim 1, wherein the second projections are formed outside a propagation path of light propagating between the optical waveguide and the opto-electronic element.

4. The optical module according to claim 1, wherein:
   the elastic layer disperses stress occurring when the plurality of projections comes into direct contact with the opto-electronic element.

5. The optical module according to claim 1, wherein the optical waveguide structure comprises:
   a first clad portion having a groove on a convex side of a curved surface of which the cross section is curved in a circular arc shape, the groove extending in a curved direction of the curved surface;
   a core portion formed in the groove to propagate incident light; and
   a second clad portion formed on the convex side of the curved surface so as to cover the core portion.

6. The optical module according to claim 1, wherein the opto-electronic element is a surface light emitting element or a surface light receiving element.

* * * * *